United States Patent
Ramesh et al.

(10) Patent No.: US 12,026,172 B2
(45) Date of Patent: Jul. 2, 2024

(54) SYSTEM AND METHOD FOR AUTOMATICALLY VALIDATING DATA STORED IN MULTIPLE LOCATIONS

(71) Applicant: BANK OF AMERICA CORPORATION, Charlotte, NC (US)

(72) Inventors: Manojkumar Ramesh, Kanchipuram (IN); Shalini Gillella, Frisco, TX (US)

(73) Assignee: Bank of America Corporation, Charlotte, NC (US)

( * ) Notice: Subject to any disclaimer, the term of this patent is extended or adjusted under 35 U.S.C. 154(b) by 401 days.

(21) Appl. No.: 17/122,307

(22) Filed: Dec. 15, 2020

(65) Prior Publication Data
US 2022/0188324 A1    Jun. 16, 2022

(51) Int. Cl.
*G06F 16/25* (2019.01)
*G06F 16/22* (2019.01)
*G06F 16/23* (2019.01)

(52) U.S. Cl.
CPC ........ *G06F 16/254* (2019.01); *G06F 16/2282* (2019.01); *G06F 16/2365* (2019.01); *G06F 16/258* (2019.01)

(58) Field of Classification Search
CPC ............... G06F 16/254; G06F 16/2282; G06F 16/2365; G06F 16/258
See application file for complete search history.

(56) References Cited

U.S. PATENT DOCUMENTS

| | | |
|---|---|---|
| 6,389,414 B1 | 5/2002 | Delo et al. |
| 6,633,875 B2 | 10/2003 | Brady |
| 7,047,529 B2 | 5/2006 | Delo |
| 7,054,430 B2 | 5/2006 | Lynam et al. |
| 7,346,519 B2 | 3/2008 | Carr et al. |
| 7,595,754 B2 | 9/2009 | Mehta |
| 7,714,729 B2 | 5/2010 | Pape et al. |
| 7,895,315 B2 | 2/2011 | Weinrich et al. |
| 8,065,323 B2 | 11/2011 | Sallakonda et al. |
| 8,131,692 B2 | 3/2012 | Daniello et al. |
| 8,386,419 B2 | 2/2013 | Yalamanchilli |
| 8,423,790 B2 | 4/2013 | Atashband et al. |
| 8,516,245 B2 | 8/2013 | Kumagai et al. |
| 8,600,929 B2 | 12/2013 | Paul |
| 8,700,645 B2 | 4/2014 | Weissman |
| 8,819,068 B1 | 8/2014 | Knote et al. |
| 8,838,531 B2 | 9/2014 | Bentkofsky et al. |

(Continued)

*Primary Examiner* — Charles D Adams

(57) ABSTRACT

An apparatus includes a memory and a processor. The processor receives a request to validate target data against source data. The processor identifies a disagreement between an element of source data and a corresponding element of target data. The disagreement indicates that the ordered set of alphanumeric characters representing the source element is different from the ordered set of alphanumeric characters representing the target element. In response to identifying the disagreement, the processor determines that the source element does not match the target element, where the source element includes a first value stored according to a first format, and the target element includes a second value stored according to a second format. In response, the processor extracts an element of the source data corresponding to the source element, transforms this element from the first format to the second format, and loads it into the target data.

20 Claims, 4 Drawing Sheets

(56) References Cited

U.S. PATENT DOCUMENTS

| | | |
|---|---|---|
| 9,396,037 B2 | 7/2016 | Morsi et al. |
| 9,430,505 B2 | 8/2016 | Padmanabhan |
| 9,460,171 B2 | 10/2016 | Marrelli et al. |
| 9,519,695 B2 | 12/2016 | Sampathkumaran et al. |
| 9,535,971 B2 | 1/2017 | Essawil et al. |
| 9,547,702 B2 | 1/2017 | Vilakkumadathil |
| 9,563,670 B2 | 2/2017 | Wasson et al. |
| 9,710,530 B2 | 7/2017 | Li et al. |
| 9,710,536 B2 | 7/2017 | Li et al. |
| 9,760,601 B2 | 9/2017 | Burke et al. |
| 9,792,324 B2 | 10/2017 | Drubner |
| 10,019,593 B1 | 7/2018 | Patel et al. |
| 10,025,672 B2 | 7/2018 | Maranna et al. |
| 10,067,993 B2 | 9/2018 | Dhayapule et al. |
| 10,073,979 B2 | 9/2018 | Von Kaenel et al. |
| 10,409,801 B2 | 9/2019 | Foebel et al. |
| 10,528,585 B2 | 1/2020 | Bender |
| 10,558,645 B2 * | 2/2020 | Abalos .................. G06F 16/252 |
| 10,740,848 B2 | 8/2020 | Bernard et al. |
| 11,138,220 B2 * | 10/2021 | Shah ..................... G06F 16/282 |
| 11,366,858 B2 * | 6/2022 | Atallah ............. G06F 16/90332 |
| 2016/0171540 A1 | 6/2016 | Mangipudi et al. |
| 2017/0103167 A1 | 4/2017 | Shah |
| 2017/0244627 A1 | 8/2017 | Lovy et al. |
| 2018/0053401 A1 | 2/2018 | Martin et al. |
| 2018/0365305 A1 | 12/2018 | Li et al. |

* cited by examiner

Figure 2:
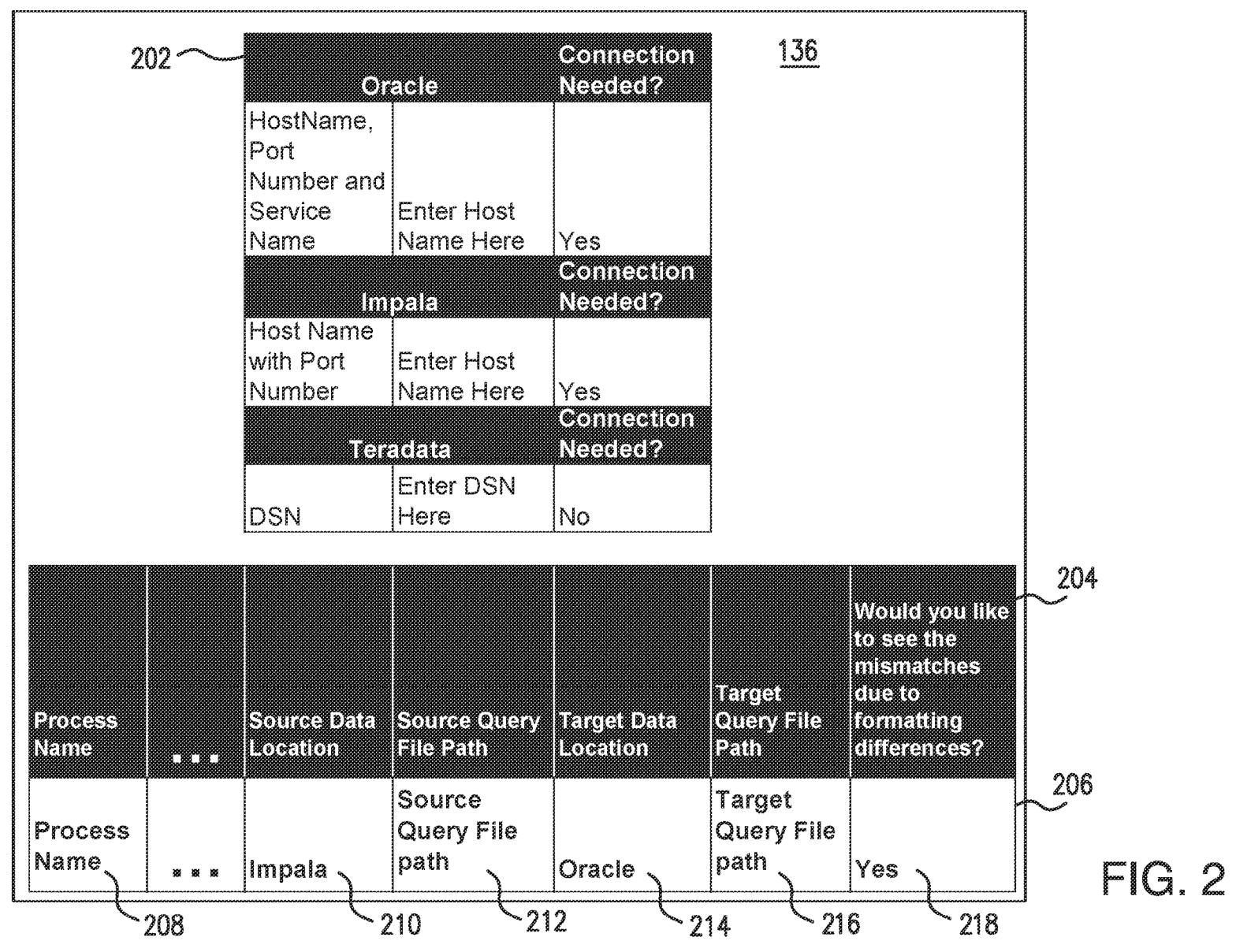

136

| | Oracle | Connection Needed? |
|---|---|---|
| HostName, Port Number and Service Name | Enter Host Name Here | Yes |
| | Impala | Connection Needed? |
| Host Name with Port Number | Enter Host Name Here | Yes |
| | Teradata | Connection Needed? |
| DSN | Enter DSN Here | No |

202

| Process Name | ... | Source Data Location | Source Query File Path | Target Data Location | Target Query File Path | Would you like to see the mismatches due to formatting differences? |
|---|---|---|---|---|---|---|
| Process Name | ... | Impala | Source Query File path | Oracle | Target Query File path | Yes |

SYSTEM AND METHOD FOR AUTOMATICALLY VALIDATING DATA STORED IN MULTIPLE LOCATIONS

TECHNICAL FIELD

The present disclosure relates generally to information storage and retrieval, and more particularly, to a system and method for automatically validating data stored in multiple locations.

BACKGROUND

Data validation is the process of checking data to help ensure its accuracy and/or quality. Data validation is often performed after data has been extracted from a source location and loaded into a target location, to detect any errors that may have been introduced during the extraction and loading processes.

SUMMARY

During an extract, transform, load (ETL) process, data extracted from a source location may undergo one or more transformations before being loaded into a target location. For example, the data may be converted from one format into another. A data validation process that does not take into account such formatting differences between source and target data will identify these differences as disagreements between the source and target data that may require further review and possibly remediation (even though the ETL process that extracted and loaded the data may have executed without error). A human may then need to review the identified disagreements to determine whether or not they correspond to actual data mismatches, or are simply due to formatting differences. While this may not be an issue where the data undergoing validation is small, it is completely impractical in the context of big data, where millions of data elements are regularly transferred from one storage location to another.

This disclosure contemplates a data validation tool that takes into account any formatting differences that may exist between a set of target data and the corresponding source data from which the target data was copied when performing a validation process on the target data. In response to receiving a request to validate a set of target data against a corresponding set of source data, the tool loads both the target data and the source data into memory. For each element of target data, the tool compares the alphanumeric representation of the target data with the alphanumeric representation of the corresponding source data, to identify a set of disagreements. For each identified disagreement between a target data element and a corresponding source data element, the tool applies a set of formatting rules to determine whether the disagreement is an actual mismatch, resulting from a difference in values of the target data element and the source data element, or simply a result of a formatting difference. An embodiment of the tool is described below.

According to an embodiment, a system includes a first database, a second database, a memory, and a hardware processor communicatively coupled to the memory. The first database stores a first source table. The second database stores a first target table. The first target table includes data extracted from the first source table and loaded into the first target table. The hardware processor receives a first request to validate a set of data stored in the first target table against a set of data stored in the first source table. Each element of the set of data stored in the first target table corresponds to an element of the set of data stored in the first source table. In response to receiving the first request, the processor loads the set of data stored in the first source table into the memory as a first set of loaded source data. The processor also loads the set of data stored in the first target table into the memory as a first set of loaded target data. The processor additionally compares each element of the first set of loaded source data with a corresponding element of the first set of loaded target data to identify a set of disagreements. The set of disagreements includes a first disagreement between a first element of the first set of loaded source data and a corresponding first element of the first set of loaded target data. The first element of the first set of loaded source data includes a first ordered set of alphanumeric characters. The first element of the first set of loaded target data includes a second ordered set of alphanumeric characters. The first disagreement indicates that the first ordered set of alphanumeric characters is different from the second ordered set of alphanumeric characters. In response to identifying the first disagreement, the processor determines that the first element of the first set of loaded source data does not match the first element of the first set of loaded target data. Here, the first element of the first set of loaded source data includes a first value stored according to a first format, and the first element of the first set of loaded target data includes a second value stored according to a second format. The first value is different from the second value and the second format is different from the first format. Determining that the first element of the first set of loaded source data does not match the first element of the first set of loaded target data includes determining that the first format is different from the second format, and converting the first element of the first set of loaded source data from the first format to the second format and/or converting the first element of the first set of loaded target data from the second format to the first format. In response to determining that the first element of the first set of loaded source data does not match the first element of the first set of loaded target data, the processor extracts an element of the first source table corresponding to the first element of the first set of loaded source data. The processor also transforms the element of the first source table from the first format to the second format. The processor additionally loads the transformed element of the first source table into the first target table.

Certain embodiments provide one or more technical advantages. As an example, an embodiment reads a character stream from a source data file into a memory buffer, and then reads the source data from the memory buffer into an array, for comparison with a corresponding array of target data. Because reading data from internal memory is more efficient than reading data from disk storage or over a network, certain embodiments of the tool conserve processing resources as compared with conventional methods of reading data files, thereby enabling the validation of large quantities of target data in significantly less time than conventional methods. As another example, an embodiment automatically identifies and remediates mismatches between source data and corresponding target data in an efficient manner, before the mismatches are able to impact the results of data analysis performed on the target data, thereby conserving the computational resources that would otherwise be expended on repeating the data analysis after the mismatches were ultimately identified and remediated. As a further example, an embodiment conserves memory by writing the details of each identified mismatch to a file, after the mismatch has been identified, rather than storing all of the mismatches in memory and waiting until the completion of the mismatch identification process to output the results. The data validation tool described in the present disclosure may particularly be integrated into a practical application of a tool for use by an organization that is migrating millions of records from a legacy platform into a new platform, a process for which manual validation of the data is completely impractical. In particular, because the tool is designed to obtain and compare target data to source data in a manner that minimizes total memory usage, the tool improves the functioning of existing data validation systems and enables the validation of millions of records of data in significantly less time than possible with existing systems. Furthermore, by automatically identifying and remediating mismatches between data copied from the legacy platform into the new platform, the tool helps to prevent data analysis errors that may arise from errors that were introduced when data was copied into the new platform, thereby conserving computational resources that would otherwise be expended on tracking down the cause of the data analysis errors and repeating the analysis.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 2 illustrates an example input file that may be provided to the data validation tool of the system presented in FIG. 1 to instruct the tool to perform one or more data validation processes;

DETAILED DESCRIPTION

Embodiments of the present disclosure and its advantages may be understood by referring to FIGS. 1 through 4 of the drawings, like numerals being used for like and corresponding parts of the various drawings.

I. System Overview

Figure 1:
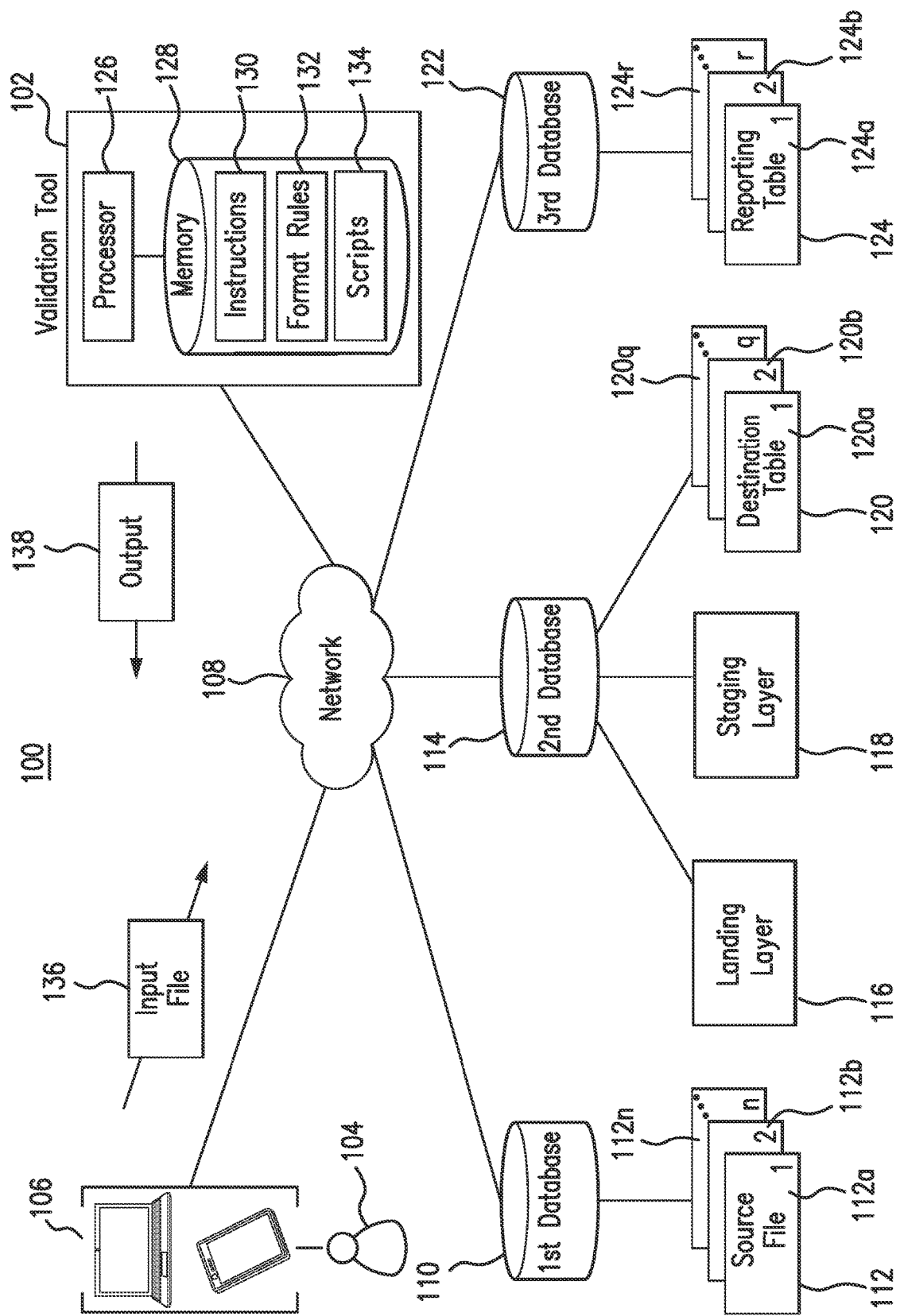
FIG. 1 illustrates an example data validation system.

FIG. 1 illustrates an example data validation system 100 that includes data validation tool 102, user(s) 104, device(s) 106, network 108, first database 110, second database 114, and, in certain embodiments, third database 122. Generally, data validation tool 102 is configured to identify disagreements and/or mismatches between target data and the corresponding source data, from which the target data was obtained. For example, data validation tool 102 may be used to verify that one or more extract, transform, load (ETL) processes did not introduce any errors when copying data from a source location into one or more target locations. In certain embodiments, data validation tool 102 is also configured to remediate any identified mismatches. As used throughout this disclosure, a disagreement between a source data element and a target data element refers to a situation in which the alphanumeric representation of the target data element is not the same as the alphanumeric representation of the source data element. For example, a disagreement will exist between a source data element with an alphanumeric representation of "01-01-2020," and a target data element with an alphanumeric representation of "01/01/2020," despite the fact that both representations correspond to the same date value. On the other hand, a mismatch between a source data element and a target data element refers to a situation in which the value of the target data element does not agree with the value of the source data element, taking into account any formatting differences that may lead to different alphanumeric representations between the source data element and the target data element. For example, a mismatch will not exist between the above source and target data elements of "01-01-2020," and "01/01/2020," respectively, but a mismatch will exist between a source data element with an alphanumeric representation of "01-01-2020," and a target data element with an alphanumeric representation of "01/01/2019," because these data elements differ not only in the formats used to express the dates, but in the actual dates themselves. Details of the manner by which data validation tool 102 identifies disagreements and/or mismatches are presented below and in the discussion of FIGS. 2 through 4.

Devices 106 are used by users 104 located on network 108 to communicate with data validation tool 102 and/or any other components of system 100. As an example, in certain embodiments, device 106 is used by a user 104 to generate input file 134 and/or to transmit input file 134 to validation tool 102. Input file 134 is used by user 104 to request that data validation tool 102 perform one or more validation processes on certain data stored in system 100. For example, input file 134 may be used by user 104 to request that data validation tool 102 validate one or more ETL processes that were executed in system 100 in order to copy data from a source location (e.g., source file 112a) into one or more target locations (e.g., target table 120a). Further details of the information included in input file 134 are provided below, in the discussion of FIG. 2. As another example, in certain embodiments, device 106 is used by a user 104 to receive output information 138 from data validation tool 102. Output information 138 may include any suitable information that data validation tool 102 may transmit to user 104, including: (1) an indication that the tool has finished performing one or more data validation processes; (2) an identification of any disagreements and/or mismatches discovered by the tool; (3) an explanation of any disagreements and/or mismatches identified by the tool; and/or (4) any other suitable information.

Devices 106 include any appropriate device for communicating with components of system 100 over network 108. For example, device 106 may be a telephone, a mobile phone, a computer, a laptop, a wireless or cellular telephone, a tablet, a server, an IoT device, and/or an automated assistant, among others. This disclosure contemplates devices 106 being any appropriate device for sending and receiving communications over network 108. Device 106 may also include a user interface, such as a display, a microphone, keypad, or other appropriate terminal equipment usable by user 104. In some embodiments, an application executed by a processor of device 106 may perform the functions described herein.

Network 108 facilitates communication between and amongst the various components of system 100. This disclosure contemplates network 108 being any suitable network operable to facilitate communication between such components. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In certain embodiments, network 108 may correspond to both an internal network and an external network. For example, in certain embodiments, validation tool 102, second database 114, third database 122, and/or device 106 may belong to an organization and may be located on the organization's internal network. On the other hand, first database 110 may be a data storage location not belonging/external to the organization. In such embodiments, network 108 may correspond to an internal network when facilitating communication between components of system 100 belonging to the organization, and network 108 may correspond to an external network when facilitation communication between a component of system 100 belonging to the organization and a component of system 100 not belonging/external to the organization.

First database 110 corresponds to any storage system that is configured to store one or more source files 112. Source files 112 include any suitable files for storing data. For example, source files 112 may include text files, spreadsheets, and/or any other suitable files. In certain embodiments, one or more source files 112 may correspond to the source of data for an ETL process executed within system 100. For example, one or more ETL processes may be executed within system 100 to extract data from one or more source files 112 and to load the data into second database 114 and/or third database 122.

Second database 114 corresponds to any storage system that is configured to store data that has been extracted from source files 112 and loaded into second database 114. As illustrated in FIG. 1, in certain embodiments, second database 114 includes multiple layers. For example, second database 114 may include a landing layer 116, a staging layer 118, and a target layer that includes destination tables 120. An ETL process may make use of one or more of these layers when loading data from source files 112 into second database 114. As an example, in certain embodiments, an ETL process may use landing layer 116 and/or staging layer 118 as intermediate data storage locations for data extracted from source files 112, before loading this data into destination tables 120. For example, in certain embodiments, when data is extracted from source files 112, it is initially copied into landing layer 116. Landing layer 116 may store the data in its raw format (e.g., in the same file format as the source file 112 from which it was extracted), or in any other suitable format. In certain embodiments, staging layer 118 may be used to prepare the data that has been copied from source files 112 into landing layer 116 (or data that has been copied from source files 112 directly into staging layer 118) for further processing. For instance, in certain embodiments, an ETL process may involve loading data that has been stored in its raw format in landing layer 116 into one or more tables in staging area 118. In certain embodiments, the ETL process may involve performing one or more transformations on the data stored in staging area 118. As an example, the ETL process may involve cleaning the data by, for example, mapping "NULL" values to "0," mapping "Male" to "M" and "Female" to "F," ensuring that dates and other values are expressed using consistent formatting, and/or any other suitable data cleansing. As another example, the ETL process may involve one or more conversions, such as, for example, unit of measurement conversions, date/time conversions, and/or any other suitable conversions. Destination tables 120 correspond to persistent storage locations for data copied from source files 112 into second database 114. In certain embodiments, an ETL process may involve copying data from landing layer 116 and/or staging layer 118 into destination tables 120. In some embodiments, an ETL process may involve copying data from source files 112 directly into destination tables 120. In certain embodiments, one or more transformations, such as those described above, may be performed on the data that has been copied into destination tables 120. While illustrated in FIG. 1 as all belonging to the same database 114, in certain embodiments, one or more of landing layer 116, staging layer 118, and destination tables 120 may correspond to separate databases/storage locations from the others.

In certain embodiments, system 100 includes third database 122. Third database 122 corresponds to any storage system that is configured to store data that has been extracted from destination tables 120. In certain embodiments, third database 122 is a reporting database that stores data that is used to generate reports regarding the current state of the organization to which second database 114 and/or third database 122 belongs. Because the report generating process may involve significant data retrieval from third database 122, third database 122 may be designed as a read-efficient database. This may be in contrast to second database 114, which may be a write-efficient database.

As described above, an ETL process, executed in system 100, may copy data from source files 112 into any number of different locations in second database 114 and/or third database 122. As an example, an ETL process may: (1) copy data from first source file 112a into landing layer 116; (2) copy the data from landing layer 116 into staging layer 118, where one or more transformations may be performed on the data; (3) copy the data from staging layer 118 into destination table 120a; and (4) copy the data from destination table 120a into reporting table 124a. As another example, an ETL process may: (1) copy data from second source file 112b directly into destination table 120b. In certain embodiments, source files 112a through 112n, destination tables 120a through 120q, and/or reporting tables 124a through 124r correspond to persistent storage locations. In some embodiments, landing zone 116 and/or staging zone 118 correspond to transitory storage locations. For example, in certain embodiments, after data validation tool 102 has validated the data copied from source files 112 into target tables 120 and/or reporting tables 120, system 100 may delete any copies of this validated data from landing layer 116 and/or staging layer 118.

Databases 110, 114, and 122 may be any suitable storage systems. One or more of databases 110, 114, and 122 may be a file system, a centralized database, a distributed database, a relational database, a non-relational database, a cloud-based database, and/or any other suitable type of database and/or storage system. While illustrated in FIG. 1 as including three databases, system 100 may include any number of storage locations. As an example, in certain embodiments, two or more of databases 110, 114, and 122 may correspond to the same storage location. As another example, in certain embodiments, source files 112 may be stored in multiple storage systems 110. As a further example, multiple databases 114 may exist to store destination tables 120 and/or multiple databases 122 may exist to store reporting tables 124.

As illustrated in FIG. 1, data validation tool 102 includes processor 126 and memory 128. This disclosure contemplates processor 126 and memory 128 being configured to perform any of the functions of data validation tool 102 described herein. For example, processor 126 may execute instructions 130 stored in memory 128 to perform any of the functions described herein. Instructions 130 may be written in Java or any other suitable programming language. Data validation tool 102 may execute instructions 130 to: (1) receive a request to validate target data stored in one or more locations of second database 114 and/or third database 122 against source data (e.g., data stored in source file 112); (2) load both the target data and the source data into memory 128; (3) compare each element of target data against the corresponding element of source data; (4) identify disagreements between elements of source data and target data; (5) determine whether the identified disagreements correspond to actual mismatches, or are a result of formatting differences; and (6) write the identified mismatches to an output file 138. In certain embodiments, data validation tool 102 may also remediate any identified mismatches. These functions of data validation tool 102 are described in further detail below, in the discussion of FIGS. 3 and 4.

Processor 126 is any electronic circuitry, including, but not limited to central processing unit(s) (CPUs), graphics processing unit(s) (GPUs), microprocessors, application specific integrated circuits (ASIC), application specific instruction set processor (ASIP), and/or state machines, that communicatively couples to memory 128 and controls the operation of data validation tool 102. Processor 126 may be 8-bit, 16-bit, 32-bit, 64-bit or of any other suitable architecture. Processor 126 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 126 may include other hardware and software that operates to control and process information. Processor 126 executes software stored on memory to perform any of the functions described herein. Processor 126 controls the operation and administration of data validation tool 102 by processing information received from device(s) 106, network 108, first database 110, second database 114, third database 122, and/or memory 128. Processor 126 may be a programmable logic device, a microcontroller, a microprocessor, any suitable processing device, or any suitable combination of the preceding. Processor 126 is not limited to a single processing device and may encompass multiple processing devices. For example, in certain embodiments, a first processor 126 may be configured to identify data mismatches, and a second processor 126 may be configured to correct the identified mismatches.

Memory 128 may store, either permanently or temporarily, data, operational software, or other information for processor 126. Memory 128 may include any one or a combination of volatile or non-volatile local or remote devices suitable for storing information. For example, memory 128 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 128, a disk, a CD, or a flash drive. In particular embodiments, the software may include an application executable by processor 126 to perform one or more of the functions described herein.

In certain embodiments, memory 126 also stores format rules 132 and/or extraction scripts 134. Format rules 132 may be used by data validation tool 102 to convert data elements into a variety of different formats. Specifically, for a given data element, format rules 132 may include rules to convert the alphanumeric representation of that data element into one or more alternative alphanumeric representations that correspond to the same value as the original data element. As an example, format rules 132 may include rules to convert dates between different formats. For instance, format rules 132 may include rules to convert between the following formats: (1) month-day-year with leading zeros (e.g., 01-02-20, 01-02-2020, 01/02/20, 01/02/2020, etc.); (2) day-month-year with leading zeros (e.g., 02-01-20, 02-01-2020, 02/01/20, 02/01/2020, etc.); (3) year-month-day with leading zeros (e.g., 20-01-02, 2020-01-02, 20/01/02, 2020/01/02, etc.); (4) month-day-year with no leading zeros (e.g., 1-2-20, 1-2-2020, 1/2/20, 1/2/2020, etc.); (5) day-month-year with no leading zeros (e.g., 2-1-20, 2-1-2020, 2/1/20, 2/1/2020, etc.); (6) year-month-day with no leading zeros (e.g., 20-1-2, 2020-1-2, 20/1/2, 2020/1/2, etc.); (7) month name-day-year with no leading zeros (e.g., Jan. 2, 2020); (8) any of the above formats with the time appended to the date (e.g., 2020-01-02 00:00:00, 2020-1-2 00:00:00, etc.); and/or (8) any other suitable date formats. As another example, format rules 132 may include rules to convert between numbers with leading zeros (e.g., 000123, −000123, etc.) and numbers without leading zeros (e.g., 123, −123, etc.). As another example, format rules 132 may include rules to convert between different units of measurement (e.g., centimeters to meters, meters to feet, kilometers to miles, cents to dollars, ounces to liters, kilograms to pounds, etc.). As a further example, format rules 132 may include rules to convert between various decimal point representations (e.g., no decimal places, one decimal place, two decimal places, etc.).

Extraction scripts 134 may be used by data validation tool 102 to extract data from databases 110, 114, and/or 122 for use in the validation process. As a specific example, in response to receiving a request to validate data stored in reporting table 124a against corresponding data stored in destination table 120a, data validation tool 102 may use a first extraction script 134 to extract the data from reporting table 124a and a second extraction script 134 to extract the corresponding data from destination table 120a. Extraction scripts 134 may be and/or include any suitable instructions that may be used by data validation tool 102 to extract data from databases 110, 114, and/or 122. For example, in certain embodiments, extraction scripts 134 include SQL scripts. Extraction scripts 134 may be generated in any suitable manner. As an example, in certain embodiments, extraction scripts 134 may be generated by users 104 and stored in memory 126. In some embodiments, and as described in further detail below, in the discussion of FIG. 2, users 104 may specify the locations in memory 128 of these extraction instructions 134 through input file 136. As another example, in certain embodiments, extraction scripts 134 may be generated automatically by validation tool 102 in response to receiving a specification of a location (e.g., a file name, a table name, a column name, etc.) where data that is to be accessed during the validation process is stored. In certain embodiments, input file 136 may specify these locations.

Modifications, additions, or omissions may be made to the systems described herein without departing from the scope of the invention. For example, system 100 may include any number of users 104, devices 106, networks 108, first databases 110, second databases 114, and third databases 122. The components may be integrated or separated. Moreover, the operations may be performed by more, fewer, or other components. Additionally, the operations may be performed using any suitable logic comprising software, hardware, and/or other logic.

II. Input File

FIG. 2 presents an example input file 136 that may be used by user 104 to request that data validation tool 102 perform one or more data validation processes. As illustrated in FIG. 2, input file 136 may include two sections—first section 202 and second section 204. First section 202 may be used by users 104 to specify details about the databases (e.g., databases 110, 114, and/or 122) in which the data to be validated is stored. For example, first section 202 may include details (e.g., a host name, a data source name (DSN), etc.) that may be used by database tool 102 to access the database(s) in which the data to be validated is stored.

Second section 204 may be used to specify one or more validation processes 206 that are to be performed by data validation tool 102. As illustrated in FIG. 2, second section 204 may correspond to a table in which each row 206 of the table specifies a data validation process to be performed by data validation tool 102. Each column of the table may then specify information relevant to the specified data validation process. For example, as illustrated in FIG. 2, column 208 may be used to specify a name used to label the data validation process, column 210 may specify the location of the source data for the validation process (e.g., database 114), and column 212 may specify a file location in memory 128 where instructions 134 that may be used to extract the source data from the source location specified in column 210 is located. Similarly, column 214 may specify the location of the target data (e.g., database 122), and column 216 may specify a file location in memory 128 where a script 134 that may be used to extract the target data from the target location specified in column 214 is located. In certain embodiments, input file 136 may enable user 104 to indicate whether or not he/she would like data validation tool 102 to provide, as output, all disagreements between the target data and the source data, or only those disagreements that are due to actual data mismatches and not simply formatting differences. For example, as illustrated in FIG. 2, user 104 may specify "Yes" in column 218 (which asks if the user would like to see mismatches due to formatting differences) to see all disagreements between the target data and the source data.

In certain embodiments, each data validation process 206 (e.g., each row of table 204) may correspond to an ETL process that has previously been performed in system 100. In such embodiments, table 204 may include multiple sets of columns 210 through 218, each of which is used to specify information relevant to the validation of a portion of the ETL process. For example, consider an ETL process that was performed in system 100 to: (1) extract data from source file 112a and load it into landing layer 116; (2) copy the data from landing layer 116 into staging layer 118, where one or more transformations were applied to the data; (3) copy the data from staging layer 118 into destination table 120a; and (4) copy the data from destination table 120a into reporting table 124a. For each of these steps, table 214 may include a set of columns 210 through 218 that specify information that may be used by data validation tool 102 to identify both the target data and the source data against which the target data is to be validated. As an example, table 204 may include a first set of columns 210 through 218 that are used to specify (1) the storage system 110 in which source file 112a is stored; (2) the location of source file 112a within storage system 110; (3) the database 114 that includes the landing layer 116 into which the data from the source file 112a is copied; and (4) the location of instructions 134 to extract the data that has been copied from source file 112a and is stored in landing layer 116. In certain embodiments, this first set of columns 210 through 218 may also include a column that is used to specify whether source file 112a is a fixed-width file or a delimited file that uses a given delimiter (e.g., comma (,), semi-colon (;), pipe (|), forward slash (/), backward slash (\), etc.). Similarly, table 204 may include a second set of columns 210 through 218 that provide information that may be used by data validation tool 102 to validate the data copied into staging layer 118. For example, this second set of columns 210 through 218 may include columns that are used to specify the database 114 that includes the staging layer 118 into which the data has been copied and the location of instructions 134 that may be executed to extract this data. The second set of columns 210 through 218 may also include columns that are used to specify the storage location (database 110 or 114, for example) in which the source data, against which the staging layer data is to be compared, and the location of instructions 134 that may be executed to extract this data. Input file 136 may additionally include a third set of columns 210 through 218 that provide information that may be used by data validation tool 102 to validate the data copied into destination table 120a, and a fourth set of columns 210 through 218 that provide information that may be used by data validation tool 102 to validate the data copied into reporting table 124a.

Input file 136 may specify any number of data validation processes for data validation tool 102 to perform. For example, while FIG. 2 illustrates table 204 as including a single row 206 (corresponding to a single validation process), this disclosure contemplates that table 204 could include any number of rows 206, each of which may be used to specify a different validation process for validation tool 102 to perform. In this manner, user 104 may request that validation tool 102 perform any number of validation processes, simply by submitting a single input file 136 to data validation tool 102, which includes a row 206 for each requested validation process.

III. Mismatch Identification

Figure 3:
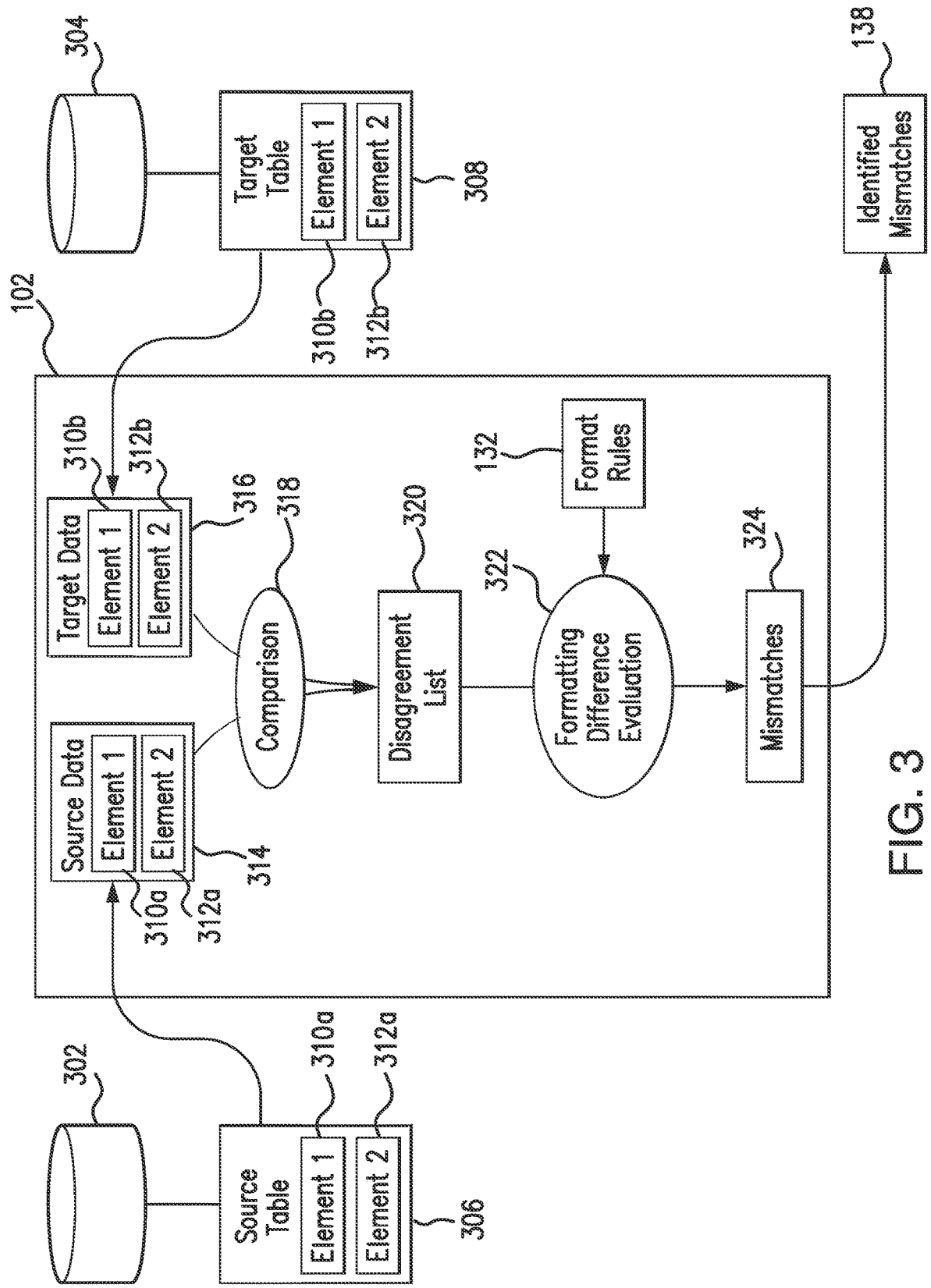
FIG. 3 illustrates an example of the manner by which the data validation tool of the system presented in FIG. 1 identifies mismatches between data stored in two different locations.

FIG. 3 presents an example illustrating the manner by which data validation tool 102 identifies mismatches between data that has been copied from a first location (illustrated as source table 306 residing in source database 302) into a second location (illustrated as target table 308 residing in target database 304). Source database 302 may correspond to any suitable storage location in system 100, as illustrated in FIG. 1. As an example, in certain embodiments, source database 302 corresponds to first database 110. In such embodiments, source table 306 may correspond to a collection of data stored as a fixed-width or delimited source file 112. As another example, in certain embodiments, source database 302 corresponds to second database 114. In such embodiments, source table 306 may correspond to data stored in landing layer 116, data stored in staging layer 118, or a destination table 120. Similarly, target database 304 may also correspond to any suitable storage location in system 100. As an example, in certain embodiments, target database 304 corresponds to third database 122. In such embodiments, target table 308 corresponds to a reporting table 124. As another example, in certain embodiments, target database 304 corresponds to second database 114. In such embodiments, target table 308 may correspond to data stored in landing layer 116, data stored in staging layer 118, or a destination table 120.

Target table 308 stores data that has been extracted from source table 306. Accordingly, each data element of target table 308 is associated with a corresponding data element of source table 306. For example, first data element 310b of target table 308 corresponds to first data element 310a of source table 306, and second data element 312b of target table 308 corresponds to second data element 312b of source table 306. In certain embodiments, first element 310b and second element 312b may have been loaded into target table 308 of target database 304 during an ETL process. For example, the ETL process may have extracted first element 310a and second element 312a from source table 306, performed one or more transformations on the elements, and loaded the elements into target table 308 as first element 310b and second element 312b, respectively.

Data validation tool 102 may be configured to validate the data stored in target table 308 against the corresponding data stored in source table 306 in response to any suitable event. For example, in certain embodiments, data validation tool 102 is configured to validate the data stored in target table 308 against the corresponding data stored in source table 306 in response to receiving an indication that an ETL process has been performed in system 100, which extracted data from source table 306 and loaded the data into target table 308. In some embodiments, data validation tool 102 is configured to validate the data stored in target table 308 against the corresponding data stored in source table 306 in response to receiving a request to perform such validation. For example, as described above, in the discussion of FIG. 2, in certain embodiments, user 104 may submit one or more data validation request to data validation tool 102 through the use of input file 136.

In response to receiving a request to validate data stored in target table 308 against the corresponding data stored in source table 306 (or receiving any other indication that such data validation is to be performed), data validation tool 102 loads the data associated with the data validation process into memory 128. For example, data validation tool 102 (1) loads the data from source table 306 into memory 128, where it is stored as source data 314, and (2) loads the data from target table 308 into memory 128, where it is stored as target data 316. Data validation tool 102 may load the data from source table 306 and target table 308 into memory 128 in any suitable manner. For example, in certain embodiments, data validation tool 102 executes instructions 130 that are written in the Java programming language to load the data into memory 128, where it is stored in one or more ArrayLists. As an example, where source table 306 and/or target table 308 correspond to data stored in a file, data validation tool 102 may use an instance of the BufferedReader Java class to read the lines of the file into an ArrayList. As another example, where source table 306 corresponds to a data table stored in a relational database 302 and/or target table 308 corresponds to a data table stored in a relational database 304, data validation tool 102 may (1) execute an SQL script 134 to extract the relevant data from database into an SQL ResultSet and (2) use a While Loop and an instance of the StringBuffer class to iterate over the rows of data in the ResultSet and load the data directly into an ArrayList.

a. Identifying Disagreements Between Target Data and Source Data

After data validation tool 102 has loaded source data 314 and target data 316 into memory 128, data validation tool next performs comparison 318. For each element of target data 316, comparison 318 involves determining whether the alphanumeric representation of the target data element matches the alphanumeric representation of the corresponding element of source data 314. For example, data validation tool 102 determines whether the alphanumeric representation of first data element 310b of target data 316 matches the alphanumeric representation of the corresponding first data element 310a of source data 314, and whether the alphanumeric representation of second data element 312b of target data 316 matches the alphanumeric representation of the corresponding second data element 312a of source data 314. In certain embodiments, data validation tool 102 executes instructions 130 that are written in the Java programming language to perform comparison 318. For example, in certain embodiments, data validation tool 102 uses the CollectionUtils.subtract function to compare the data elements of target data 316 with the corresponding data elements of source data 314. Data validation tool 102 stores any identified disagreements between data elements of target data 316 and corresponding data elements of source data 314 in disagreement list 320. Disagreement list 320 identifies any disagreements between elements of target data 316 and the corresponding elements of source data 314, regardless of whether the disagreements are caused by differences in the actual values of the data elements, or differences in the formats and/or units used to express the values. As an example, disagreement list 320 may identify a disagreement between a first element 310b of target data 316 that is represented using a different format than a corresponding first element 310a of source data 314 even though both data elements correspond to the same value (e.g., 2020/12/31 00:00:00 and 12/31/2020). As another example, disagreement list 320 may identify a disagreement between a second element 312b of target data 316 with an alphanumeric representation of "01/02/1999," and the corresponding second element 312a of source data 314 with an alphanumeric representation of "03/20/2019," which both correspond to different actual values.

In certain embodiments, data validation tool 102 may send disagreement list 320 to user 104 as output 138. For example, in some embodiments, user 104 may request that data validation tool 102 identify all disagreements between target data 316 and source data 314, including disagreements that are due to formatting differences alone.

In certain embodiments, prior to performing the above-described comparison, data validation tool 102 first performs a preliminary comparison between source data 314 and target data 316 to determine whether any obvious differences exist between source data 314 and target data 316. Any such obvious differences may indicate that an error occurred in the process that was used to copy data from source table 306 into target table 308, before any further analysis is performed. For example, comparison 318 may include a preliminary comparison between the total number of data elements included in source data 314 and the total number of data elements included in target data 316. If these totals do not match, data validation tool 102 may alert user 104 to a potential error that occurred during the process that was used to copy data from source table 306 into target table 308. For example, data validation tool 102 may transmit a message 138 to user 104 alerting user 104 to this potential error.

b. Determining Whether any Identified Disagreements are Due to Formatting Differences After generating disagreement list 320, data validation tool 102 next performs formatting difference evaluation 322. During formatting difference evaluation 322, data validation tool 102 uses format rules 132 to analyze each disagreement of disagreement list 320 that was identified between an element of target data 316 and an element of source data 314, to determine whether the disagreement is an actual mismatch between the data elements (e.g., the data elements correspond to different values), or is simply due to a formatting difference between the data elements (e.g., the data elements correspond to the same value but are represented in different formats and/or different units).

Data validation tool 102 may use format rules 132 to analyze the identified disagreements in disagreement list 320 in any suitable manner. As an example, consider a disagreement between first data element 310b of target data 316 and the corresponding first data element 310a of source data 314. In certain embodiments, data validation tool 102 first determines whether data element 310b and data element 310a both correspond to the same type of data. For example, data validation tool 102 may determine that data element 310a corresponds to a date, an integer, a floating-point number, or any other suitable data type. Data validation tool 102 may then determine whether data element 310b corresponds to this same data type. If data validation tool 102 determines that data element 310a and data element 310b do not correspond to the same data type (e.g., data element 310a corresponds to a date and data element 310b corresponds to an integer), data validation tool 102 determines that the identified disagreement between data element 310a and data element 310b is an actual mismatch 324. If data validation tool 102 determines that data element 310a and data element 310b do correspond to the same data type, in certain embodiments, data validation tool 102 next determines whether data element 310a and data element 310b are stored according to the same format. If data validation tool 102 determines that data element 310a and data element 310b are stored according to the same format, data validation tool 102 determines that the identified disagreement between data element 310a and data element 310b is an actual mismatch 324. If data validation tool 102 determines that data element 310a and data element 310b are not stored according to the same format, data validation tool 102 next uses format rules 132 to convert these data elements into the same format. For example, data validation tool 102 may use format rules 132 to: (1) convert data element 310b into the same format as data element 310a; (2) convert data element 310a into the same format as data element 310b; or (3) convert data element 310a and data element 310b into the same third data format. After converting data element 310a and data element 310b into the same format, data validation tool 102 next determines whether the alphanumeric representations of these data elements match. If the alphanumeric representations match, data validation tool 102 determines that the disagreement between the data elements was due to a difference in format and not a difference in the value of the data elements. If the alphanumeric representations do not match, data validation tool 102 determines that the identified disagreement between data element 310a and data element 310b is an actual mismatch 324.

As another example of a manner by which data validation tool 102 may determine whether or not an identified disagreement between first data element 310b of target data 316 and the corresponding first data element 310a of source data 314 is an actual mismatch, in certain embodiments, data validation tool 102 uses format rules 132 to convert data element 310b into a set of data elements that includes representations of data element 310b in each of the possible data formats. For example, where data element 310b is a date expressed in the format month-day-year with leading zeros, data validation tool 102 may convert data element 310b into the following formats: day-month-year with leading zeros; year-month-day with leading zeros; month-day-year with no leading zeros; day-month-year with no leading zeros; year-month-day with no leading zeros; month name-day-year with no leading zeros; any of the above formats with the time appended to it; and/or any other suitable date formats included in format rules 132. Data validation tool 102 may then compare data element 310a to each representation of data element 310b. If data validation tool 102 determines that data element 310a matches any of the representations of data element 310b, data validation tool 102 determines that the identified disagreement between data element 310a and data element 310b was due to a difference in formatting and not a difference in the underlying value of the data elements. If data validation tool 102 determines that data element 310a does not match any of the representations of data element 310b, data validation tool 102 determines that the identified disagreement between data element 310a and data element 310b is an actual mismatch 324. While the above discussion describes using format rules 132 to convert data element 310b into a set of data elements that includes representations of data element 310b in each of the possible data formats and then comparing these representations to data element 310a, this disclosure also contemplates that in certain embodiments, data validation tool 102 may convert data element 310a into a set of data elements that includes representations of data element 310a in each of the possible data formats and then compare these representations to data element 310b.

In certain embodiments, after identifying a mismatch 324 between an element of target data 316 and the corresponding element of source data 314, data validation tool 102 writes details about the mismatch to output file 138. For example, for each identified mismatch 324 between a data element 310b in target data 316 and a data element 310a in source data 314, data validation tool 102 may write the alphanumeric representations of the data elements 310a and 310b to output file 138. Data validation tool 102 may also write the locations of the data elements in target database 304 and source database 302 in output file 138. For example, for each of source data element 310a and target data element 310b, data validation tool 102 may include details that identify the row and the field of the table in which the data element is stored. In some embodiments, data validation tool 102 may also write details to output file 138 about disagreements in disagreement list 320 that the tool determined where not actual mismatches 324. For example, for each disagreement in disagreement list 320, data validation tool 102 may indicate in output file 138 whether the disagreement is an actual mismatch 324 or is simply due to a formatting difference. In some embodiments, and as described in further detail below, in the discussion of FIG. 4, after identifying one or mismatches 324 between elements of target data 316 and the corresponding elements of source data 314, data validation tool 102 automatically remediates the identified mismatches 324.

IV. Method for Identifying and Remediating Data Mismatches

Figure 4:
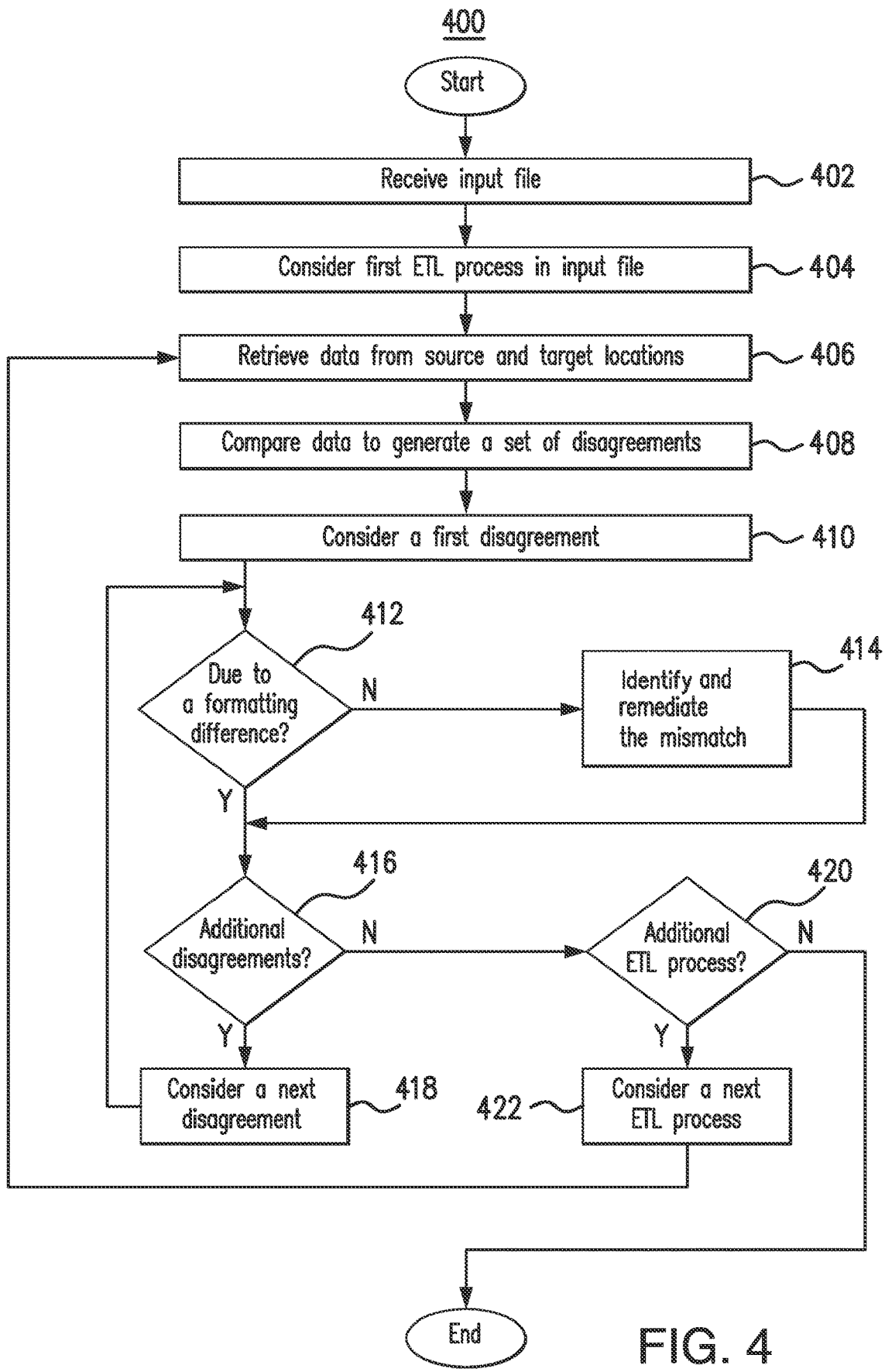
FIG. 4 presents a flowchart illustrating an example process by which the data validation tool of the system presented in FIG. 1 identifies mismatches between data stored in two different locations and remediates the identified mismatches.

FIG. 4 presents a flowchart (described in conjunction with elements of FIGS. 1 and 3) illustrating an example method 400 by which data validation tool 102 identifies mismatches between data copied from source tables 306 into target tables 308. In step 402, data validation tool 102 receives an input file 136. Input file 136 includes a set of requests for validation of data that has been copied from a source table 306 into one or more target tables 308, for example, as part of an ETL process. In step 404 data validation tool 102 considers a first data validation request (e.g., a first ETL process identified in input file 136). Input file 136 may indicate that, as part of a first ETL process, for example, data has been copied from a source table 306 into a target table 308. In step 406 data validation tool 102 retrieves the data identified in input file 136 from source table 306 and stores it in memory 128 as source data 314. Data validation tool 102 also retrieves the data identified in input file 136 from target table 308 and stores it in memory 128 as target data 316. In step 408 data validation tool 102 compares target data 316 and source data 314 to generate disagreement list 320. Disagreement list 320 includes a set of disagreements between elements of target data 316 and corresponding elements of source data 314, each of which indicates that the alphanumeric representation of a target data element (e.g., data element 310b) does not match the alphanumeric representation of the corresponding source data element (e.g., data element 310a). In step 410 data validation tool 102 considers a first disagreement in disagreement list 320. In step 412 data validation tool 102 determines whether this disagreement is due to a difference in formatting between the two data elements or a difference in the actual values of the two data elements. If, in step 412 data validation tool 102 determines that the disagreement is due to a formatting difference, in step 416 data validation tool 102 determines whether disagreement list 320 includes any additional disagreements. If, in step 416 data validation tool 102 determines that disagreement list 320 includes additional disagreements, in step 418 data validation tool 102 considers a next disagreement in disagreement list 320. Method 400 then returns to step 406.

If, in step 412 data validation tool 102 determines that the disagreement is not due to a formatting difference, but is an actual mismatch 324, in step 414 data validation tool 102 identifies mismatch 324 by writing detail about the mismatch to an output file 138 and/or remediates mismatch 324. In some embodiments, data validation tool 102 remediates mismatch 324 by replacing the target data element (e.g., target data element 310b) stored in target database 304 with the corresponding source data element (e.g., source data element 310a). In certain embodiments, replacing the target data element with the corresponding source data element includes using format rules 132 to convert the source data element into the same format as the target data element. While FIG. 4 illustrates data validation tool 102 as remediating a mismatch 324 in step 412, in certain embodiments, data validation tool 102 waits until the completion of method 400 to remediate the set of identified mismatches 324.

If, in step 416 data validation tool 102 determines that disagreement list 320 does not include any additional disagreements, in step 420 data validation tool 102 determines whether input file 136 includes any additional requests for data validation. If, in step 420 data validation tool 102 determines that input file 136 includes additional requests for data validation, in step 422 data validation tool 102 considers a next request for validation. Method 400 then returns to step 412.

Modifications, additions, or omissions may be made to method 400 depicted in FIG. 4. Method 400 may include more, fewer, or other steps. For example, steps may be performed in parallel or in any suitable order. While discussed as data validation tool 102 (or components thereof) performing the steps, any suitable component of system 100, such as device(s) 106, for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
   a first database configured to store a first source table in a legacy platform;
   a second database configured to store a first target table in a new platform, the first target table comprising data extracted from the first source table and loaded into the first target table;
   a memory; and
   a hardware processor communicatively coupled to the memory, the hardware processor configured to:
   receive a first request to validate a first plurality of data stored in the first target table against a second plurality of data stored in the first source table, wherein:
   the first plurality of data stored in the first target table comprises a first plurality of elements;
   the second plurality of data stored in the first source table comprises a second plurality of elements; and
   each element of the first plurality of elements corresponds to an element of the second plurality of elements of the second plurality of data stored in the first source table;
   in response to receiving the first request:
   load the second plurality of data stored in the first source table into the memory as a first set of loaded source data;
   load first plurality set of data stored in the first target table into the memory as a first set of loaded target data;
   in response to loading the first plurality of data and the second plurality of data, compare each element of the first plurality of elements of the first set of loaded source data with a corresponding element of the second plurality of elements of the first set of loaded target data;
   automatically identify a plurality of disagreements as a result of the comparison of the first plurality of elements of the first set of loaded source data and the second plurality of elements of the first set of loaded target data before the plurality of disagreements are able to impact results of data analysis performed on the first set of loaded target data, the plurality of disagreements comprising a first disagreement between a first element of the first plurality of elements of the first set of loaded source data and a corresponding first element of the second plurality of elements of the first set of loaded target data, wherein:
  the first element of the first plurality of elements of the first set of loaded source data comprises a first ordered set of alphanumeric characters;
  the first element of the second plurality of elements of the first set of loaded target data comprises a second ordered set of alphanumeric characters;
  the first disagreement indicates that the first ordered set of alphanumeric characters is different from the second ordered set of alphanumeric characters;
  the first element of the first plurality of elements of the first set of loaded source data comprises a first value stored according to a first format;
  the first element of the second plurality of elements of the first set of loaded target data comprises a second value stored according to a second format;
  the first value is different from the second value; and
  the second format is different from the first format;
in response to determining the first disagreement, determine whether the first format is different from the second format;
in response to determining that the first format is different from the second format, convert the first element of the second plurality of elements of the first set of loaded target data from the second format to the first format;
determine whether the first element of the first plurality of elements of the first set of loaded source data matches a reformatted version of the first element of the second plurality of elements of the first set of loaded target data;
in response to determining that the first element of the first plurality of elements of the first set of loaded source data does not match the reformatted version of the first element of the second plurality of elements of the first set of loaded target data, extract the reformatted version of the first element of the second plurality of elements from the first target table;
transform the reformatted version of the first element of the second plurality of elements extracted from the first target table to match the first element of the first plurality of elements of the first set of loaded source data;
load a transformed version of the first element of the second plurality of elements the first element of the first plurality of elements of the first set of loaded source data into the first target table; and
write one or more details associated with the first disagreement to an output file as a first mismatch.

2. The system of claim 1, wherein in response to determining that the first element of the first plurality of elements of the first set of loaded source data does not match the reformatted version of the first element of the second plurality of elements of the first set of loaded target data, the hardware processor is further configured to output the first element of the first plurality of elements of the first set of loaded source data and the first element of the second plurality of elements of the first set of loaded target data to an output file.

3. The system of claim 1, wherein:
the plurality of disagreements further comprises a second disagreement between a second element of the first plurality of elements of the first set of loaded sources data and a corresponding second element of the second plurality of elements of the first set of loaded target data, wherein:
  the second element of the first plurality of elements of the first set of loaded source data comprises a third ordered set of alphanumeric characters;
  the second element of the second plurality of elements of the first set of loaded target data comprises a fourth ordered set of alphanumeric characters;
  the second disagreement indicates that the third ordered set of alphanumeric characters is different from the fourth ordered set of alphanumeric characters;
  the second element of the first plurality of elements of the first set of loaded source data comprises a third value stored according to the first format; and
  the second element of the second plurality of elements of the first set of loaded target data comprises the third value stored according to the second format.

4. The system of claim 3, wherein the hardware processor is further configured to output the second element of the first plurality of elements of the first set of loaded source data, the second element of the second plurality of elements of the first set of loaded target data, and an explanation of the second disagreement to an output file, the explanation indicating that the second disagreement is a result of a formatting difference between the second element of the first plurality of elements of the first set of loaded source data and the second element of the second plurality of elements of the first set of loaded target data.

5. The system of claim 1, wherein:
the first database is further configured to store a second source table in the legacy platform;
the second database is further configured to store a second target table in the new platform, the second target table comprising data extracted from the second source table and loaded into the second target table; and
the hardware processor is further configured to:
  receive a second request to validate a third plurality of data stored in the second target table against a fourth plurality of data stored in the second source table, wherein:
    the third plurality of data stored in the second target table comprises a third plurality of elements;
    the fourth plurality of data stored in the second source table comprises a fourth plurality of elements; and
    each element of the third plurality of elements corresponds to an element of the fourth plurality of data stored in the second source table;
  in response to receiving the second request:
    load the fourth plurality of data stored in the second source table into the memory as a second set of loaded source data;
    load the third plurality of data stored in the second target table into the memory as a second set of loaded target data; and
    in response to loading the third plurality of data and the fourth plurality of data, compare each element of the third plurality of elements of the second set of loaded source data with a corresponding element of the fourth plurality of elements of the second set of loaded target data.

6. The system of claim 5, wherein:
the memory is further configured to store an input file, the input file comprising a first set of inputs associated with the first request and a second set of inputs associated with the second request;

receiving the first request comprises reading the first set of inputs from the input file; and receiving the second request comprises reading the second set of inputs from the input file.

7. The system of claim 1, wherein:

each of the first element of the first set of loaded source data and the first element of the first set of loaded target data comprise a date; and each of the first format and the second format are chosen from the set comprising:
- month-day-year with leading zeros;
- day-month-year with leading zeros;
- year-month-day with leading zeros;
- month-day-year with no leading zeros;
- day-month-year with no leading zeros;
- year-month-day with no leading zeros;
- month-day-year and time with leading zeros;
- day-month-year and time with leading zeros;
- year-month-day and time with leading zeros;
- month-day-year and time with no leading zeros;
- day-month-year and time with no leading zeros;
- year-month-day and time with no leading zeros; and
- month name-day-year with no leading zeros.

8. A method comprising:

receiving a first request to validate a first plurality of data stored in a first target table in a new platform against a second plurality of data stored in a first source table in a legacy platform, wherein:
- the first plurality of data stored in the first target table comprises a first plurality of elements;
- the second plurality of data stored in the first source table comprises a second plurality of elements; and
- each element of the first plurality of elements corresponds to an element of the second plurality of data stored in the first source table;

in response to receiving the first request:

loading the second plurality of data stored in the first source table into a memory as a first set of loaded source data;

loading the first plurality of data stored in the first target table into the memory as a first set of loaded target data;

in response to loading the first plurality of data and the second plurality of data, comparing each element of the first plurality of elements of the first set of loaded source data with a corresponding element of the second plurality of elements of the first set of loaded target data;

automatically identifying a plurality of disagreements as a result of the comparison of the first plurality of elements of the first set of loaded source data and the second plurality of elements of the first set of loaded target data before the plurality of disagreements are able to impact results of data analysis performed on the first set of loaded target data, the plurality of disagreements comprising a first disagreement between a first element of the first plurality of elements of the first set of loaded source data and a corresponding first element of the second plurality of elements of the first set of loaded target data, wherein:
- the first element of the first plurality of elements of the first set of loaded source data comprises a first ordered set of alphanumeric characters;
- the first element of the second plurality of elements of the first set of loaded target data comprises a second ordered set of alphanumeric characters;
- the first disagreement indicates that the first ordered set of alphanumeric characters is different from the second ordered set of alphanumeric characters;
- the first element of the first plurality of elements of the first set of loaded source data comprises a first value stored according to a first format;
- the first element of the second plurality of elements of the first set of loaded source data comprises a second value stored according to a second format;
- the first value is different from the second value; and
- the second format is different from the first format;

in response to determining the first disagreement, determining whether the first format is different from the second format;

in response to determining that the first format is different from the second format, converting the first element of the second plurality of elements of the first set of loaded target data from the second format to the first format; and determining whether the first element of the first plurality of elements of the first set of loaded source data matches a reformatted version of the first element of the second plurality of elements of the first set of loaded target data;

in response to determining that the first element of the first plurality of elements of the first set of loaded source data does not match the reformatted version of the first element of the second plurality of elements of the first set of loaded target data, extracting the reformatted version of the first element of the second plurality of elements from the first target table;

transforming the reformatted version of the first element extracted from the first target table to match the first element of the first plurality of elements of the first set of loaded source data;

loading a transformed version of the first element of the second plurality of elements extracted from the first target table to match the first element of the first plurality of elements of the first set of loaded source data into the first target table; and writing one or more details associated with the first disagreement to an output file as a first mismatch.

9. The method of claim 8, further comprising, in response to determining that the first element of the first plurality of elements of the first set of loaded source data does not match the reformatted version of the first element of the second plurality of elements of the first set of loaded target data, outputting the first element of the first plurality of elements of the first set of loaded source data and the first element of the second plurality of elements of the first set of loaded target data to an output file.

10. The method of claim 8, wherein:

the plurality of disagreements further comprises a second disagreement between a second element of the first plurality of elements of the first set of loaded sources data and a corresponding second element of the second plurality of elements of the first set of loaded target data, wherein:
- the second element of the first plurality of elements of the first set of loaded source data comprises a third ordered set of alphanumeric characters;
- the second element of the second plurality of elements of the first set of loaded target data comprises a fourth ordered set of alphanumeric characters;
- the second disagreement indicates that the third ordered set of alphanumeric characters is different from the fourth ordered set of alphanumeric characters;

the second element of the first plurality of elements of the first set of loaded source data comprises a third value stored according to the first format; and the second element of the second plurality of elements of the first set of loaded target data comprises the third value stored according to the second format.

11. The method of claim 10, further comprising outputting the second element of the first plurality of elements of the first set of loaded source data, the second element of the second plurality of elements of the first set of loaded target data, and an explanation of the second disagreement to an output file, the explanation indicating that the second disagreement is a result of a formatting difference between the second element of the first plurality of elements of the first set of loaded source data and the second element of the second plurality of elements of the first set of loaded target data.

12. The method of claim 8, further comprising:
receiving a second request to validate a third plurality of data stored in a second target table against a fourth plurality of data stored in a second source table, wherein:
the third plurality of data stored in the second target table comprises a third plurality of elements;
the fourth plurality of data stored in the second source table comprises a fourth plurality of elements; and
each element of the third plurality of elements corresponds to an element of the fourth plurality of elements of the fourth plurality of data stored in the second source table;
in response to receiving the second request:
loading the fourth plurality of data stored in the second source table into the memory as a second set of loaded source data;
loading the third plurality of data stored in the second target table into the memory as a second set of loaded target data; and
in response to loading the third plurality of data and the fourth plurality of data, comparing each element of the third plurality of elements of the second set of loaded source data with a corresponding element of the fourth plurality of elements of the second set of loaded target data.

13. The method of claim 12, wherein:
receiving the first request comprises reading a first set of inputs from an input file; and
receiving the second request comprises reading a second set of inputs from the input file.

14. The method of claim 8, wherein:
each of the first element of the first set of loaded source data and the first element of the first set of loaded target data comprise a date; and
each of the first format and the second format are chosen from the set comprising:
month-day-year with leading zeros;
day-month-year with leading zeros;
year-month-day with leading zeros;
month-day-year with no leading zeros;
day-month-year with no leading zeros;
year-month-day with no leading zeros;
month-day-year and time with leading zeros;
day-month-year and time with leading zeros;
year-month-day and time with leading zeros;
month-day-year and time with no leading zeros;
day-month-year and time with no leading zeros;
year-month-day and time with no leading zeros; and
month name-day-year with no leading zeros.

15. An apparatus comprising:
a memory; and
a hardware processor communicatively coupled to the memory, the hardware processor configured to:
receive a first request to validate a first plurality of data stored in a first target table in a new platform against a second plurality of data stored in a first source table in a legacy platform, wherein:
the first plurality of data stored in the first target table comprises a first plurality of elements;
the second plurality of data stored in the first source table comprises a second plurality of elements; and
each element of the first plurality of elements corresponds to an element of the second plurality of data stored in the first source table;
in response to receiving the first request:
load the second plurality of data stored in the first source table into the memory as a first set of loaded source data;
load the first plurality of data stored in the first target table into the memory as a first set of loaded target data;
in response to loading the first plurality of data and the second plurality of data, compare each element of the first plurality of elements of the first set of loaded source data with a corresponding element of the second plurality of elements of the first set of loaded target data;
automatically identify a plurality of disagreements as a result of the comparison of the first plurality of elements of the first set of loaded source data and the second plurality of elements of the first set of loaded target data before the plurality of disagreements are able to impact results of data analysis performed on the first set of loaded target data, the plurality of disagreements comprising a first disagreement between a first element of the first plurality of elements of the first set of loaded source data and a corresponding first element of the second plurality of elements of the first set of loaded target data, wherein:
the first element of the first plurality of elements of the first set of loaded source data comprises a first ordered set of alphanumeric characters;
the first element of the second plurality of elements of the first set of loaded target data comprises a second ordered set of alphanumeric characters;
the first disagreement indicates that the first ordered set of alphanumeric characters is different from the second ordered set of alphanumeric characters;
the first element of the first plurality of elements of the first set of loaded source data comprises a first value stored according to a first format;
the first element of the second plurality of elements of the first set of loaded source data comprises a second value stored according to a second format;
the first value is different from the second value; and
the second format is different from the first format;
in response to determining the first disagreement, determine whether the first format is different from the second format;
in response to determining that the first format is different from the second format, convert the first element of the second plurality of elements of the first set of loaded target data from the second format to the first format; and
determine whether the first element of the first plurality of elements of the first set of loaded source data matches a reformatted version of the first element of the second plurality of elements of the first set of loaded target data;

in response to determining that the first element of the first plurality of elements of the first set of loaded source data does not match the reformatted version of the first element of the second plurality of elements of the first set of loaded target data, extract the reformatted version of the first element of the second plurality of elements from the first target table;

transform the reformatted version of the first element extracted from the first target table to match the first element of the first plurality of elements of the first set of loaded source data;

load a transformed version of the first element of the second plurality of elements extracted from the first target table to match the first element of the first plurality of elements of the first set of loaded source data into the first target table; and write one or more details associated with the first disagreement to an output file as a first mismatch.

16. The apparatus of claim 15, wherein in response to determining that the first element of the first plurality of elements of the first set of loaded source data does not match the reformatted version of the first element of the second plurality of elements of the first set of loaded target data, the hardware processor is further configured to output the first element of the first plurality of elements of the first set of loaded source data and the first element of the second plurality of elements of the first set of loaded target data to an output file.

17. The apparatus of claim 15, wherein:
the plurality of disagreements further comprises a second disagreement between a second element of the first plurality of elements of the first set of loaded sources data and a corresponding second element of the second plurality of elements of the first set of loaded target data, wherein:
the second element of the first plurality of elements of the first set of loaded source data comprises a third ordered set of alphanumeric characters;
the second element of the second plurality of elements of the first set of loaded target data comprises a fourth ordered set of alphanumeric characters;
the second disagreement indicates that the third ordered set of alphanumeric characters is different from the fourth ordered set of alphanumeric characters;
the second element of the first plurality of elements of the first set of loaded source data comprises a third value stored according to the first format; and
the second element of the second plurality of elements of the first set of loaded target data comprises the third value stored according to the second format.

18. The apparatus of claim 17, wherein the hardware processor is further configured to output the second element of the first plurality of elements of the first set of loaded source data, the second element of the second plurality of elements of the first set of loaded target data, and an explanation of the second disagreement to an output file, the explanation indicating that the second disagreement is a result of a formatting difference between the second element of the second plurality of elements of the first set of loaded source data and the second element of the second plurality of elements of the first set of loaded target data.

19. The apparatus of claim 15, wherein the hardware processor is further configured to:
receive a second request to validate a third plurality of data stored in a second target table against a fourth plurality of data stored in a second source table, wherein:
the third plurality of data stored in the second target table comprises a third plurality of elements;
the fourth plurality of data stored in the second source table comprises a fourth plurality of elements; and
each element of the third plurality of elements corresponds to an element of the fourth plurality of elements of the fourth plurality of data stored in the second source table;
in response to receiving the second request:
load the fourth plurality of data stored in the second source table into the memory as a second set of loaded source data;
load the third plurality of data stored in the second target table into the memory as a second set of loaded target data; and
in response to loading the third plurality of data and the fourth plurality of data, compare each element of the third plurality of elements of the second set of loaded source data with a corresponding element of the fourth plurality of elements of the second set of loaded target data.

20. The apparatus of claim 19, wherein:
the memory is further configured to store an input file, the input file comprising a first set of inputs associated with the first request and a second set of inputs associated with the second request;
receiving the first request comprises reading the first set of inputs from the input file; and
receiving the second request comprises reading the second set of inputs from the input file.

* * * * *